US012627549B2

(12) United States Patent
Baldemair et al.

(10) Patent No.: US 12,627,549 B2
(45) Date of Patent: May 12, 2026

(54) MULTIPLE SYMBOL SHIFT CONFIGURATION

(71) Applicant: Telefonaktiebolaget LM Ericsson (publ), Stockholm (SE)

(72) Inventors: Robert Baldemair, Solna (SE); Joao Vieira, Hjärup (SE); Muris Sarajlic, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 331 days.

(21) Appl. No.: 18/562,380

(22) PCT Filed: May 25, 2021

(86) PCT No.: PCT/EP2021/063791
§ 371 (c)(1),
(2) Date: Nov. 20, 2023

(87) PCT Pub. No.: WO2022/248011
PCT Pub. Date: Dec. 1, 2022

(65) Prior Publication Data
US 2024/0267272 A1      Aug. 8, 2024

(51) Int. Cl.
*H04L 27/26* (2006.01)
*H04L 25/03* (2006.01)

(52) U.S. Cl.
CPC .... *H04L 27/2613* (2013.01); *H04L 25/03006* (2013.01)

(58) Field of Classification Search
None
See application file for complete search history.

(56) References Cited

U.S. PATENT DOCUMENTS

2014/0078972 A1* 3/2014 Sorrentino ............ H04L 5/0048
                                                          370/329
2020/0374067 A1 11/2020 Vieira et al.
(Continued)

FOREIGN PATENT DOCUMENTS

WO        2019/215260 A1    11/2019

OTHER PUBLICATIONS

European Communication Pursuant to Article 94(3) EPC issued in corresponding European Patent Application No. 21729263.0, dated Feb. 18, 2025, consisting of 5 pages.
(Continued)

*Primary Examiner* — Hong S Cho
(74) *Attorney, Agent, or Firm* — Weisberg I.P. Law, P.A.

(57) ABSTRACT

A method for reducing inter symbol interference (ISI) and inter carrier interference (ICI) in transmissions between a sender and a recipient within a wireless communication network. For at least one multicarrier symbol comprising a first subcarrier modulated with an original reference signal and multiplexed with a second subcarrier modulated with an original payload signal. The method includes applying a multiple symbol shift configuration on at least a second multicarrier symbol adjacent to the first multicarrier symbol by repeating the original reference signal and the original payload signal in the second multicarrier symbol on respective subcarriers and applying a linear phase shift to each repeated reference signal and payload signal. The same linear phase shift is used for both the repeated reference signal and the repeated payload signal.

15 Claims, 6 Drawing Sheets

(56)         References Cited

U.S. PATENT DOCUMENTS

2021/0126752 A1      4/2021  Masal et al.
2022/0330043 A1*   10/2022  Wu ........................ H04L 5/0094
2023/0030823 A1*    2/2023  Wang .................... H04L 5/0005

OTHER PUBLICATIONS

International Search Report and Written Opinion dated Feb. 14, 2022 for International Application No. PCT/EP2021/063791 filed May 25, 2021, consisting of 9 pages.

Nisar, M.D., et al., On Channel Estimation and Equalization of OFDM Systems with Insufficient Cyclic Prefix, 2007 IEEE 65th Vehicular Technology Conference, Dublin, Ireland, 2007, consisting of 5 pages.

3GPP TSG RAN WG1 Meeting #88 R1-1702227, Title: UL control channel design with short duration, Source: Intel Corporation, Agenda item: 8.1.3.2.1, Document for: Discussion and Decision, Date and Location: Feb. 13-17, 2017, Athens, Greece, consisting of 6 pages.

3GPP TSG RAN WG1 Meeting #89 R1-1707639, Title: Performance evaluations on short NR-PUCCH structures, Agenda Item: 7.1.3.2.1, Source: LG Electronics, Document for: Discussion and decision, Date and Location: May 15-19, 2017, Hangzhou, P.R. China, consisting of 9 pages.

* cited by examiner

First symbol 110   Second symbol 120

First symbol 210   Second symbol 220

300

310
Apply mult symb shift conf

311
Repeat signals in second symbol

312
Shift signals using same linear shift

First symbol 510   Second symbol 520

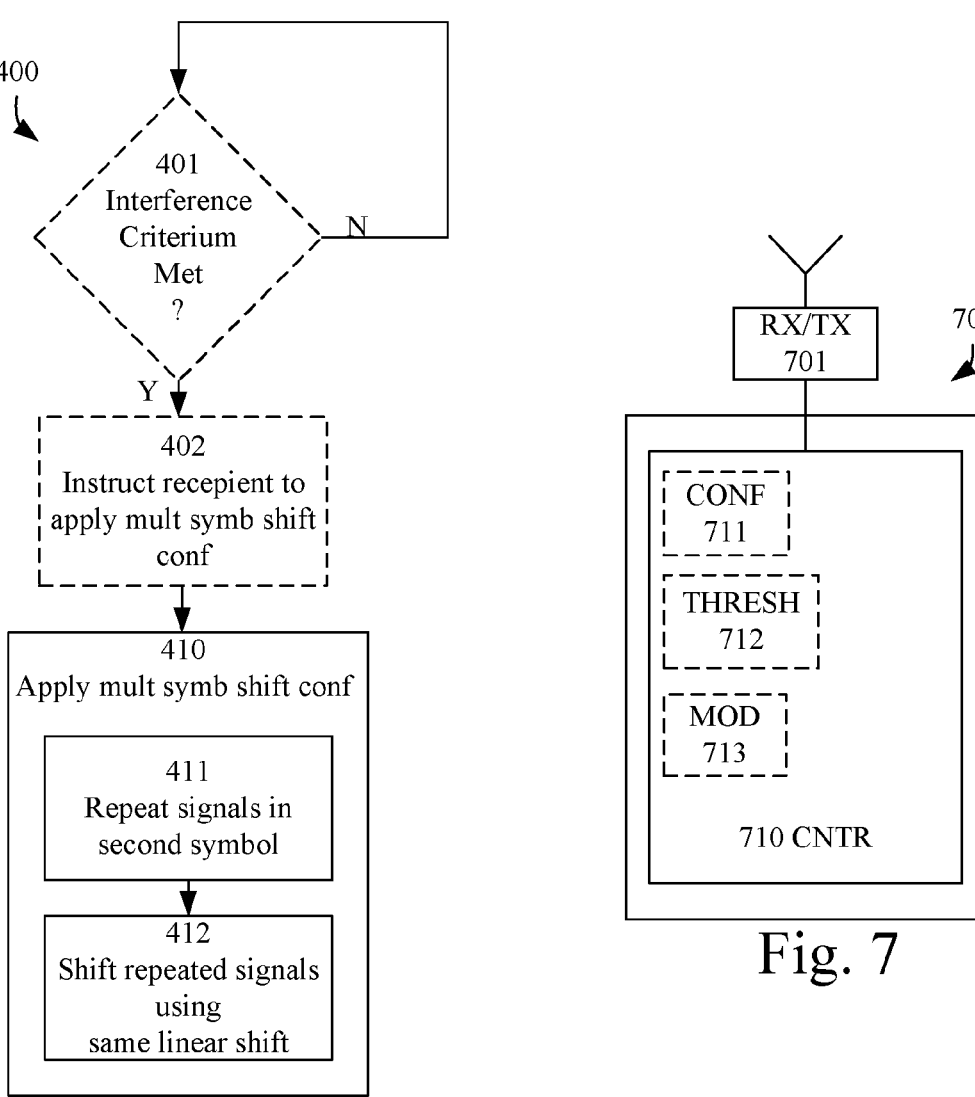
Fig. 4
Fig. 7
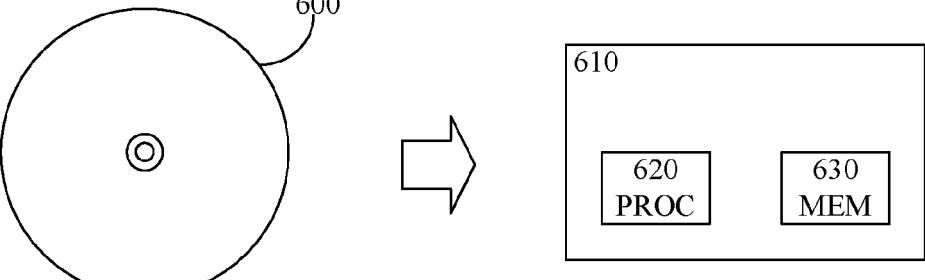
Fig. 6

MULTIPLE SYMBOL SHIFT CONFIGURATION

CROSS-REFERENCE TO RELATED APPLICATION

This application is a Submission Under 35 U.S.C. § 371 for U.S. National Stage Patent Application of International Application Number: PCT/EP2021/063791, filed May 25, 2021 entitled "MULTIPLE SYMBOL SHIFT CONFIGURATION," the entirety of which is incorporated herein by reference.

TECHNICAL FIELD

The present invention relates generally to the field of wireless communication. More particularly, it relates to methods and apparatuses for reducing inter-carrier interference (ICI) and inter-symbol interference (ISI) in a carrier.

BACKGROUND

In a multicarrier system such as an Orthogonal Frequency Division Multiplex (OFDM) system, a cyclic prefix is typically used to enable simple frequency-domain equalization. The cyclic prefix turns the linear convolution of the channel into a circular convolution. Typically, the cyclic prefix of an OFDM-symbol is obtained by copying the last samples of the symbol and attaching them to the beginning. Hence, a circular signal structure is obtained since the first and last samples in the symbol are equal in each OFDM symbol. In order to function properly, the cyclic prefix should preferably be longer (i.e. comprise enough symbol samples) than the impulse response of the channel (or at least the part of the impulse response of the channel that contains most energy) together with any other components in the transmission chain which could introduce linear distortions. Such components may e.g. be transmit- and receiver filters. Furthermore, the cyclic prefix should preferably also provide margins for non-perfect time synchronization.

If the cyclic prefix is too short, inter-symbol and inter-carrier interference (ISI and ICI) may typically occur because interference from the previous symbol may smear into the current one and the transients at the beginning of the current symbol are not yet completely decayed.

One strategy for handling this problem is typically to rely on advanced receivers such as time-domain equalizers that try to shorten the overall impulse response and/or advanced frequency-domain equalizers that try to minimize ISI and ICI. However, such advanced receivers require an accurate estimate of the impulse response to work.

However, with an insufficient cyclic prefix, the channel estimate is already corrupted which makes the above proposed techniques difficult or even impossible. Therefore, there is a need for methods and apparatuses for robust channel estimation in wireless communication systems that utilize multicarrier transmissions.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or at least mitigate some of the above disadvantages and to provide method, apparatus, computer program product, network node and wireless communication device for reducing ISI and ICI.

According to a first aspect, this is achieved by a method for reducing inter symbol interference (ISI) and inter carrier interference (ICI) in transmissions between a sender and a recipient within a wireless communication network. For at least one multicarrier symbol comprising a first subcarrier modulated with an original reference signal and multiplexed with a second subcarrier modulated with an original payload signal, the method comprises applying a multiple symbol shift configuration on at least a second multicarrier symbol adjacent to the first multicarrier symbol by repeating the original reference signal and the original payload signal in the second multicarrier symbol on respective subcarriers and by applying a linear phase shift to each repeated reference signal and payload signal. The same linear phase shift is used for both the repeated reference signal and the repeated payload signal.

In some embodiments, the method may further comprise that the original reference signal is at least one of a Demodulation Reference Signal (DMRS), a Channel State Information Reference Signal (CSI-RS) or a Sounding Reference Signal (SRS) or any other reference signal compatible with a multiple symbol structure.

In some embodiments the method may further comprise that the original payload signal is a Data signal or control signal.

In some embodiments, the method may further comprise determining whether a performance criterion is met prior to applying the multiple symbol shift configuration; and performing the step of applying the multiple symbol shift configuration when it is determined that the performance criterion is met.

In some embodiments, the method may further comprise determining whether the performance criterion is met by determining at least one of the following:

determining whether an anticipated delay spread in the wireless communication network exceeds a delay spread threshold value;

determining whether a high-order modulation coding scheme is used for transmissions within the wireless communication network;

determining whether there is a risk that a cyclic prefix applied to the multicarrier symbol is shorter than an impulse response associated with transmitting the multicarrier symbol; and receiving from the recipient an indication that the multiple symbol shift configuration is to be applied, wherein the recipient is one or more of a wireless communication device and a network node operably connected to the wireless communication network.

In some embodiments, the method may further comprise instructing the recipient to apply the multiple symbol configuration, wherein the recipient is at least one of the following: a wireless communication device and a network node.

In some embodiments, the method may further comprise informing the recipient, of the applied multiple symbol shift configuration.

In some embodiments, the method may further comprise on at least one subcarrier, that the original payload signal and the repeated and shifted payload signal comprise different payload.

In some embodiments, the method may further comprise that the original payload signal and the repeated and shifted payload signal comprise different pay load on (less than) a third of a total number of subcarriers.

A second aspect is a computer program product comprising a non-transitory computer readable medium. The non-transitory computer readable medium has stored there on a computer program comprising program instructions. The computer program is configured to be loadable into a data-processing unit, comprising a processor and a memory associated with or integral to the data-processing unit. When loaded into the data-processing unit, the computer program is configured to be stored in the memory. The computer program, when loaded into and run by the processor is configured to cause the processor to execute method steps according to the first aspect.

A third aspect is an apparatus for reducing inter symbol interference (ISI) and inter carrier interference (ICI) in transmissions between a sender and recipient within a wireless communication network. The apparatus comprises controlling circuitry configured to cause, for at least one multicarrier symbol comprising a first subcarrier modulated with an original reference signal and multiplexed with a second subcarrier modulated with an original payload signal application of a multiple symbol shift configuration on at least a second multicarrier symbol adjacent to the first multicarrier symbol, repetition of the original reference signal and the original payload signal in the second multicarrier symbol on respective subcarriers and application of a linear phase shift to each repeated reference signal and pay load signal, wherein the same linear phase shift is used for both the repeated reference signal and the repeated payload signal.

A fourth aspect is a network node configured to operate in a wireless communication network and configured to serve at least one wireless communication device operably connected to the wireless communication network. The network node comprises an apparatus according to the third aspect.

A fifth aspect is a wireless communication device configured to be operably connected to a wireless communication network and to be served by at least one network node associated with the wireless communication network. The wireless communication device comprises an apparatus according to the third aspect.

In some embodiments, the second, third, fourth and fifth aspects may additionally have features identical with or corresponding to any of the various features as explained above for the first aspect.

An advantage of some embodiments is that robust channel estimation is enabled regardless of the length of the cyclic prefix.

Another advantage of some embodiments is that ISI and ICI are reduced in multicarrier symbols.

Another advantage of some of the embodiments is that bit rate may be increased while still enabling a robust channel estimate.

BRIEF DESCRIPTION OF THE DRAWINGS

Further objects, features and advantages will appear from the following detailed description of embodiments, with reference being made to the accompanying drawings, in which:

FIG. 4 is a flowchart illustrating example method steps according to some embodiments;

FIG. 6 is a is schematic drawing illustrating a computer program product according to some embodiments;

FIG. 7 is a block diagram illustrating an example apparatus according to some embodiments;

DETAILED DESCRIPTION

In the following, embodiments will be described where ISI and ICI are reduced in scenarios where multicarrier transmission are utilized, such as for example in a New Radio (NR) or Long Term Evolution (LTE) communication network utilizing OFDM.

As noted previously, ISI and ICI are typically reduced in conventional systems using a cyclic prefix on the transmitted symbols and by relying on advanced transmitters and receiver for further interference reduction. However, different scenarios in the network may lead to that the length of the cyclic prefix becomes too short in relation to the impulse response of the channel. This in turn impacts the quality of the channel estimate which may ultimately affect the function of said advanced transmitters and receivers.

One way to increase robustness of channel estimation is to utilize double symbols for transmitting reference signals such as demodulation reference signals (DM-RS). This means that a symbol comprising DM-RS is repeated and the replica is transmitted adjacently to the original symbol. By adjacent is meant that the repeated symbol is repeated and positioned either preceding to, or subsequent to the original symbol.

Moreover, if one of the symbols of the pair is circularly shifted in time by the length of the cyclic prefix, the first symbol act as an extension of the cyclic prefix for the second symbol and much longer impulse responses can be estimated without being impaired by e.g. ISI and ICI. Thus, robustness against interference is increased. The position of the symbol affects the shift in that either a right shift (when the repeated symbol is preceding the original symbol) or a left shift is used (when the repeated symbol is subsequent to the original symbol). Both variants are present and described in this application.

More specifically ($r_n$ denotes the time-domain DM-RS samples):

$$r_{DM-RS} = \begin{bmatrix} [r_{N-2P}, r_{N-2P+1}, \ldots, r_{N-P-1}], \\ [r_{N-P}, r_{N-P+1}, \ldots, r_{N-1}, r_0, r_1 \ldots, r_{N-P-2}, r_{N-P-1}], \\ [r_{N-P}, r_{N-P+1}, \ldots, r_{N-1}], [r_0, r_1, \ldots, r_{N-1}] \end{bmatrix},$$

This can also be expressed as $$r_{DM-RS} = [\tilde{r}_{CP}, \tilde{r}, r_{CP}, r],$$

with $r=[r_0, r_1, \ldots, r_{N-1}]$ being the time-domain vector of the original one-symbol DM-RS; and $r_{CP}=[r_{N-P}, r_{N-P+1}, \ldots, r_{N-1}]$ is the original cyclic prefix of length P. $\tilde{r}(\tilde{r}n=r_{(n-P)mod\ N}, n=0, 1, \ldots, N-1)$ and $\tilde{r}_{CP}$ are the DM-RS symbol circular right shifted by P samples and the cyclic prefix of the shifted DM-RS symbol, respectively.

Figure 1:
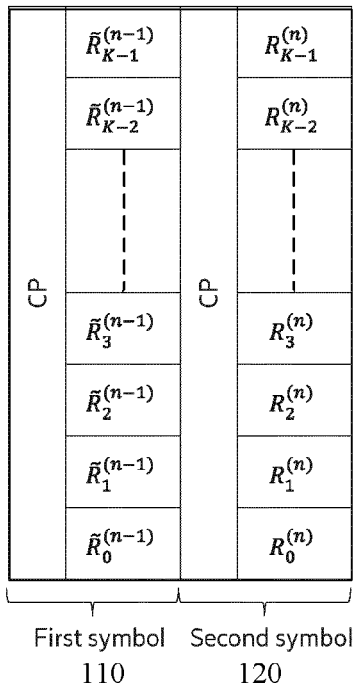
FIG. 1 is a schematic drawing illustrating a symbol configuration.

A schematic view of a double symbol with repeated and shifted signals according to the above may be seen in FIG. 1. It should be noted that FIG. 1 illustrates a scenario in the frequency domain. A linear phase shift in the frequency domain becomes a circular shift (cyclic shift) in the time domain.

A first symbol 110 and an adjacent second symbol 120 comprise K subcarriers, where K is an integer. Used subcarriers k in the second symbol 120 are modulated by reference signals $$R_k^{(n)}$$

(symbol n and subcarrier k). Furthermore, the two adjacent symbols are separated with a respective cyclic prefix, CP.

In FIG. 1, the first symbol 110 is the repeated symbol where the subcarriers are repeated and modulated with the same reference signals as those comprised in the second symbol 120, with the difference that a phase shift is applied such that the subcarriers in the first symbol are modulated with $$\tilde{R}_k^{(n-1)},$$

where $$\tilde{R}_k^{(n-1)}$$

are the reference signals $$R_k^{(n)}$$

with appropriate complex phase shift multiplied.

The above extension of the cyclic prefix by utilizing double symbols works well for multicarrier symbols (e.g. OFDM symbols) that only comprise DM-RS (or other types of reference signals) on its subcarriers. However, in many communication systems, such as Long Term Evolution (LTE) or NR, data and DM-RS are often frequency multiplexed into one symbol. This typically leads to interference between the different subcarriers carrying different type of information within the symbol, which again may impact the channel impulse estimate, despite that DM-RS are repeated and cyclic shifted (or phase shifted, when in the frequency domain).

Figure 2:
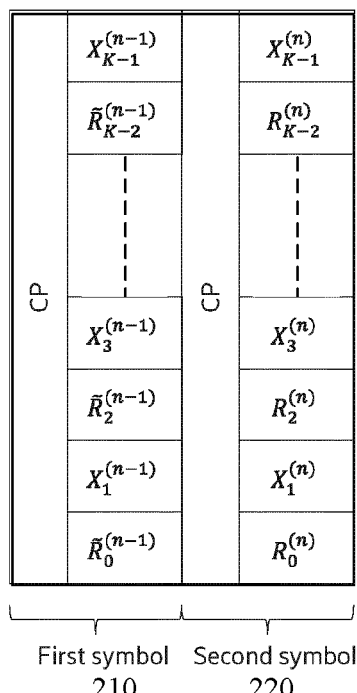
FIG. 2 is a schematic drawing illustrating a symbol configuration.

This problem is schematically illustrated in FIG. 2.

In FIG. 2, a first symbol 210 and a second adjacent symbol 220 are illustrated to comprise K (where K is an integer) subcarriers. In FIG. 2, the K subcarriers are divided into two sets of subcarriers. One set comprises the even subcarriers, and the other set comprises the odd subcarriers. Hence, the even subcarriers may be indexed with $$2k, k = 0, 1, \ldots, \frac{K}{2} - 1,$$

and the odd subcarriers may be indexed $$2k + 1, k = 0, 1, \ldots, \frac{K}{2} - 1.$$

All used even subcarriers $$2k, k = 0, 1, \ldots, \frac{K}{2} - 1,$$

in the second symbol 220 are modulated with reference signals $$R_{2k}^{(n)}$$

(symbol n, subcarriers 2k). All used even subcarriers 2k in the first symbol 210 are modulated by reference signals $$\tilde{R}_{2k}^{(n-1)},$$

where $$\tilde{R}_{2k}^{(n-1)}$$

are the reference signals $$R_{2k}^{(n)}$$

with appropriate phase multiplied (the complex exponential function for the phase factor may e.g. be $e^{j2\pi/NkP}R_k^{(n)}$ where N is the OFDM inverse fast Fourier transform (IFFT) size and P is the length of the cyclic prefix).

All used odd subcarriers $$2k + 1, k = 0, 1, \ldots, \frac{K}{2} - 1$$

in the second symbol 220 are modulated by data signals $$X_{2k+1}^{(n)}$$

(symbol n, subcarriers 2k+1). All used odd subcarriers 2k+1 in the first symbol are modulated by non-shifted data signals $$X_{2k+1}^{n-1}.$$

As seen, a contiguous waveform would be achieved over the subcarriers carrying DMRS, since these have been shifted with regards to the original symbol. However, the subcarriers carrying data are replicated without shift and hence continuity of the waveform will thus be interrupted between the subcarriers.

It should be noted that it's also contemplated that payload may be assigned to even subcarriers and reference to odd subcarriers.

The embodiments of this disclosure aims at reducing interference (and thereby enabling a robust channel estimation) in scenarios such as the above by applying a multiple symbol shift configuration where also the data signals are repeated and shifted using the same linear phase shift as the applied to the reference signal in the repeated symbol.

It should be noted that the applied shift is not identical for all subcarriers in the repeated symbol, as the shift increases linearly with the index of the subcarriers. However, the shift applied to the repeated payload signals corresponds to the shift applied to the repeated reference signals. I.e. both are generated by the same linear phase ramp. Furthermore, whenever the term "the same linear phase shift" or the term "the same cyclic shift" appears in this disclosure is should be interpreted to mean that the phase/cyclic shift (which shift increases linearly with the index of the subcarriers) applied to the repeated reference signals is reused for the repeated payload signals.

Figure 3:
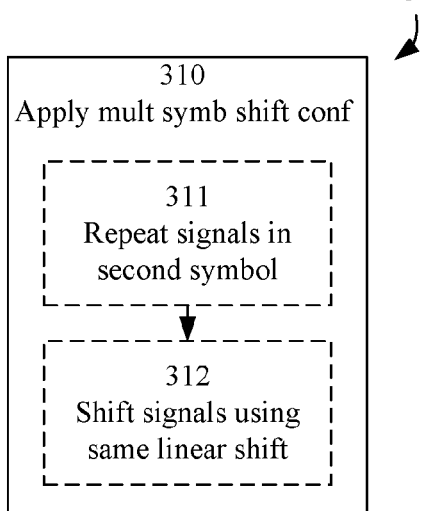
FIG. 3 is a flowchart illustrating example method steps according to some embodiments.

FIG. 3 illustrates a method 300 according to some embodiments.

The method 300 is a method for reducing inter symbol interference (ISI) and inter carrier interference (ICI) in transmissions between a sender and a recipient within a wireless communication network.

The method 300 may in some embodiments be carried out by a network node. A network node may e.g. be any one of a radio base station, an evolved node B (eNB), or a gNB or similar control node deployable in a wireless communication network.

The method 300 may in some embodiments be carried out by a wireless communication device. A wireless communication device may e.g. be any one of a mobile phone, a hand set, a lap top, a note book, a smart phone or any other device capable of wireless communication in a wireless network.

The sender may in some embodiments be a network node and/or a wireless communication device. The recipient may in some embodiments be a network node and/or a wireless communication device. In some embodiments, the sender and the recipient is the same entity.

Typically, the method 300 may, when utilized in a wireless communication network, be carried out by both a network node as well as one or more wireless communication devices which the network nodes serves.

The method 300 comprises, for at least one multicarrier symbol comprising a first subcarrier modulated with an original reference signal and multiplexed with a second subcarrier modulated with an original payload signal, in step 310 applying a multiple symbol shift configuration on at least a second multicarrier symbol adjacent to the first multicarrier symbol. The multiple symbol shift configuration may be applied in step 311 by repeating the original reference signal and the original payload signal in the second multicarrier symbol on respective subcarriers, and in step 312 by applying a linear phase shift to each repeated reference signal and payload signal, wherein the same linear phase shift is used for both the repeated reference signal and the repeated payload signal.

By using the same linear phase shift (i.e. the same linear phase ramp/same complex exponential function for the phase factor, with the phase shift increasing linearly with the subcarriers) for the payload signals as for the reference signals, a continuous waveform is achieved and the interference (which would have occurred between and/or within symbols where no shift to the payload is applied) is reduced.

This leads to that a more robust channel estimation may be performed. A more robust channel estimation may in some cases further lead to an increased bit-rate. Hence the embodiments described herein may lead to an overall performance improvement in a wireless communication network based on e.g. reduced interference, improved channel estimation and increased data transfer.

The method 300 is typically applicable to communication systems using multicarrier transmissions as well as multiple symbol structures. A typical example is LTE and NR where OFDM is used.

Furthermore, in some embodiments, the reference signal is at least one of a Demodulation Reference Signal (DMRS), a Channel State Information Reference Signal (CSI-RS), or a Sounding Reference Signal (SRS), or any other reference signal compatible with a multiple symbol structure. Hence, the terms may be used interchangeably in this disclosure.

In some embodiments, the payload signal is a Data signal or a Control signal. The payload signal may comprise other information which is typically not used for channel estimation, but may still be multiplexed together with reference signals. It should hence be noted that in this disclosure, whenever the term data or data signal is used, this may be interchanged with term payload or payload signal and hence be replaced with e.g. control signals or other type of signals that are not reference signals.

Furthermore, it should be noted that shift may be applied in time domain as cyclic shift, or in frequency domain as linear phase shift. Regardless of whether the shift is in time or frequency domain, the same shift should be applied to the reference signal and the payload signal in order to achieve a continuous waveform over the symbols.

For example, in an OFDM system, DM-RS— and data signals which is to be transmitted are typically described in frequency-domain rather than in time-domain.

Hence, consider the following scenario where payload signal applied to subcarrier k is denoted as modulation symbol $$X_k^{(n)},$$

$k \in \mathcal{S}_X$ and reference signal applied to subcarrier k is denoted as $$R_k^{(n)},$$

$k \in \mathcal{S}_R$ in OFDM symbol n. $\mathcal{S}_X$ and $\mathcal{S}_R$ are subcarrier sets for payload and reference, respectively (compare with the previously used indexing 2k and 2k+1 for the subcarriers described in FIG. 2, which indexing also applies to this embodiment).

Then, in symbol n modulation symbol $$X_k^{(n)}$$

and reference signal $$R_k^{(n)}$$

are transmitted. In symbol n−1 repeated and shifted modulation symbol $$\tilde{X}_k^{(n-1)}$$

and reference signal $$\tilde{R}_k^{(n-1)}$$

are transmitted.

Similarly, the shifted modulation symbol $$\tilde{X}_k^{(n-1)}$$

can be expressed in frequency-domain as $$\tilde{X}_k^{(n-1)} = e^{-j2\pi/NkP} X_k^{(n)}$$

with N being the OFDM inverse fast Fourier transform (IFFT) size and P being the length of the cyclic prefix.

Equivalently, if the original symbol would be the first one (symbol n) and the repeated symbol would be the next one (symbol n+1, i.e. subsequent to the original symbol due to circular left shift), repeated and shifted modulation symbol $$\tilde{X}_k^{(n+1)}$$

can be expressed as $$\tilde{X}_k^{(n+1)} = e^{j2\pi/NkP} X_k^{(n)}.$$

It should be noted that modulation symbol is a term applied in 3GPP standards for the quadrature amplitude modulation QAM symbol applied to an OFDM subcarrier. Hence, typically, when data/payload is modulated on a subcarrier the term modulation symbol may be used. Modulation symbol may hence be used interchangeably with the terms data modulation signal/data modulated signal/payload modulation signal/payload modulated signal in this disclosure. The term modulation symbol is not used for reference signals.

Using multiple symbols to transmit the same information may lead to increased overhead, and it may hence in some embodiments be of advantage to apply the method 300 when certain network conditions are met in order to get a trade-off between channel robustness and increased overhead.

Hence, in some embodiments, the method 300 may comprise additional steps. This is illustrated by the method 400 in FIG. 4. The method steps 410, 411 and 412 may e.g. correspond to the method steps 310, 311 and 312 of the method 300.

The method 400 may further comprise the step 401 where it is determined whether an performance criterion is met prior to applying the multiple symbol shift configuration (i.e. prior to applying method steps 410 or 310), and performing the step 410 of applying the multiple symbol shift configuration when it is determined that the performance criterion is met (Y-path out of 401).

When it is determined that the performance criterion is not met (N-path out of 401) application of the multiple symbol shift configuration may be refrained from (e.g. until is determined that the criterion is met). The performance criterion may e.g. relate to an expected or experienced interference. Additionally or alternatively it may relate to an operating mode used within the wireless communication network.

Furthermore, determining whether the performance criterion is met in step 401 comprises at least one of the following:

determining whether an anticipated delay spread in the wireless communication network exceeds a delay spread threshold value;

determining whether a high-order modulation coding scheme is used for transmissions within the wireless communication network;

determining whether there is a risk that a cyclic prefix applied to the multicarrier symbol is shorter than an impulse response associated with transmitting the multicarrier symbol; and receiving from the recipient an indication that the multiple symbol shift configuration is to be applied, wherein the recipient is one or more of a wireless communication device and a network node operably connected to the wireless communication network.

In some embodiments, it is imagined that the step 401 may additionally or alternatively comprise, when it is determined that the performance criterion is met, determining whether applying the multiple symbol shift configuration based any of the above described determining steps will result in the performance criterion not being met, and when so, applying the multiple symbol shift configuration.

Delay spread can in principle be interpreted as the difference between the time of arrival of the earliest significant multipath component and the time of arrival of the last multipath component. The delay spread may have an impact on e.g. ISI and ICI. In cases where the symbol duration is relatively long compared to the delay spread (typically 10 times longer), a relatively ISI free channel may be expected. However, if the delay spread increases it may negatively impact ISI and ICI.

Hence, the delay spread threshold value may be set such that if anticipated or experienced delay spread in the network (and/or the anticipated/experienced delay spread associated with e.g. the recipient and/or sender) is more than e.g. $1/10$ of the symbol duration, it may be determined that the delay spread threshold value has been exceeded, the performance criterion is thus met, and the multiple symbol shift configuration should be applied. It should be noted that the number $1/10$ as used here is an example, and other values may be used for the delay spread threshold value. The value may e.g. be dynamically set and be based on different network conditions. E.g. in a scenario where it is important that an accurate channel estimate is achieved, the delay spread threshold value may be set to a lower value in order to ensure that very little interference is formed due to delay spread. Or, it may be the other way around. I.e. some interference due to delay spread may be acceptable and hence the threshold value may e.g. be set at ²⁄₁₀ or more. It should also be noted that 10 is just an example, and other fractions of symbol duration may be contemplated.

Similarly, if the delay spread is less than the length of the cyclic prefix, a relatively ISI free channel may be expected. Hence, as an alternative or an addition, in some embodiments the delay spread threshold value may be based on the length of the cyclic prefix. It may e.g. be determined that the delay spread threshold value has been exceeded if the delay spread exceeds the length of the cyclic prefix by e.g. ⅕. As with the above example of symbol durations, other ranges for exceeding the length of the cyclic prefix may be considered and may be dynamically set (or preconfigured).

It may also be noted that in the frequency domain, coherence bandwidth corresponds to delay spread. Coherence bandwidth is typically the bandwidth over which the channel can be assumed to be flat. The coherence bandwidth may be seen as the inverse of the delay spread. Hence, the shorter the delay spread, the larger is the coherence bandwidth. In some embodiments, coherence bandwidth may be used for the delay spread threshold value.

Hence, in some embodiments, determining whether the performance criterion has been met may comprise determining whether a coherence bandwidth is less than a coherence bandwidth threshold value.

Increased delay spread may occur for various reasons. For example, in high-gain beamforming systems, especially when beamforming is applied at both transmitter and receiver, the impulse response might be shortened compared to when less beamforming is applied. However, some signals may be transmitted with less beamforming, or beamforming is used on only one link end. In this case delay spread of the wireless channel may increase.

Another typical scenario where delay spread may be a factor is when a wireless communication device receives transmissions originating from a single transmission point (TRP) and Multimedia Broadcast multicast service Single Frequency Network (MBSFN) transmissions are used, (i.e., the same message is sent from multiple synchronized TRPs). In general, a communication device perceives an MBSFN transmission as a single transmission over a channel with a long delay spread (i.e. the composite channel from the contributing TRPs). Hence, for scenarios where MBSFN applies, it may be determined that the performance criterion is met and the method 400 may continue in step 410 (or possibly in step 402, which will be elaborated on further below).

Transmissions in a OFDM based communication systems, and/or other type of multicarrier based communication system may typically be realized through high-order or low order modulation schemes. It is e.g. common to utilize higher-order modulations in downlink compared to uplink since a high-order modulation typically requires more resources in terms of power (and generally a network node such as a base station has less requirements on power utilization than e.g. a wireless communication device). However, high-order modulation schemes such as 16 quadrature amplitude modulation (QAM) or higher are typically more sensitive to ISI and ICI than low-order modulations schemes such as various types of phase shift keying (PSK).

Hence, determining whether the performance criterion in step 401 is met may comprise determining that a high-order modulation is applied in uplink or downlink or both. As an example, the high-order modulation may be applied in downlink transmissions but not in uplink; and the multiple symbol shift configuration may in such a scenario be utilized for downlink transmissions but not in uplink transmissions.

Some communication systems may allow multiple numerologies and cyclic prefix lengths. In such systems, some symbols may be transmitted with long cyclic prefixes and some may be transmitted with short cyclic prefixes. It should be noted that the terms "long" and "short" when used for denoting the length of a cyclic prefix is relative. It is typically not meaningful to exactly define a numerical value for length as being short or being long in terms of cyclic prefix. The length should preferably be seen in comparison to other factors such as e.g. the length of the channel impulse response or the length of an estimated or experienced delay spread. E.g. a cyclic prefix that is shorter than the channel impulse response may be seen as too short. Whereas, a length of the cyclic prefix that is longer than the channel impulse response, may be regarded as being long.

As elaborated on above, the length of the channel impulse response may vary based on e.g. delay spread or beam forming. Hence scenarios may arise, especially in communication systems that support multiple numerologies and cyclic prefix lengths, where a cyclic prefix pertaining to a certain numerology risks becoming shorter than the channel impulse response.

Hence, when different numerologies are allowed, symbols having cyclic prefixes which are determined to be in a shorter range, where they risk becoming shorter than the channel impulse response, may be subjected to the multiple symbol shift configuration.

Furthermore, determining that the performance criterion is met may in some embodiments relate to having received an indication or request that the multiple symbol shift configuration should be applied. The indication may e.g. be received at a network node from a wireless communication device, where the network node is the sender and the wireless communication device is the recipient. In some embodiments, it may be the other way around. The wireless communication device is the sender and the network node is the recipient.

It should be noted that the above alternatives for determining whether the performance criterion has been met may be used in combination. As an example, it may be determined that wireless communication system applies multiple numerologies, and it is also determined that the delay spread as experienced by e.g. the recipient is large. In such case the performance criterion is determined to be met for symbols having a cyclic prefix length that will be too short with regards to the delay spread experienced by the recipient. Hence, the multiple symbol shift configuration (according to e.g. method 300 or 400) may be applied to those symbols.

Another example may be that the wireless device experiences a delay spread and signals this to the network node, which triggers the use of the methods 300 and/or 400.

Determining whether the performance criterion is met may in some embodiments be seen as enabling the method 300 based on an operating mode. The operating mode may e.g. be one or more of that MBSFN transmissions are used, different numerologies are allowed, different constellations of beam forming is used, etc. The entities within the network may thus be preconfigured to apply the method 300 and/or 400 whenever the above operation modes are used.

Furthermore, in some embodiments, the methods 300 and 400 may comprise an additional step. This is illustrated in the FIG. 4 as optional method step 402. Step 402 comprises instructing the recipient to apply the multiple symbol configuration, wherein the recipient is at least one of the following: a wireless communication device and a network node.

Instructing the recipient may in some embodiments comprise configuring the recipient to apply the multiple symbol shift configuration. The configuration may be achieved through dedicated signaling. For example, by using radio resource control (RRC) signaling.

In some embodiments, instructing the recipient may comprise configuring the recipient such that it can apply either of the methods 300 or 400, based on a triggering. The triggering may e.g. be based on medium access control (MAC) element or downlink control information (DCI) signaling. In some embodiments, the triggering may be based on the above described scenarios for determining whether the performance criterion is met.

In some embodiments, the additional step 402 is a pre-configuration. I.e., when the method 300 and/or 400 is configured for an entity (e.g. a network node and/or wireless communication device), the above described conditions for applying the method may be configured as well and automatically applied so that whenever the conditions occur, the method is triggered.

In some embodiments, either of the method 300 and 400 may further comprise informing the recipient, of the applied multiple symbol shift configuration.

Hence the sender (i.e. the entity that performs the method 300 and/or 400) may inform the recipient which is to receive the multiple symbols, of the applied multiple symbol shift configuration.

Figure 5:
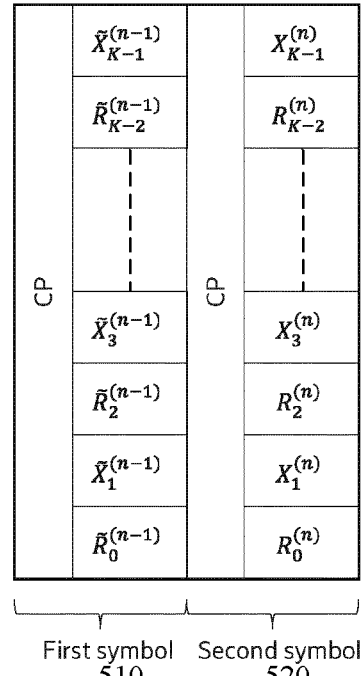
FIG. 5 is a schematic drawing illustrating a symbol configuration according to some embodiments.

When either of the method 300 and 400 are applied, the multiple symbol shift configuration may result in a multiple symbol structure with the schematic appearance seen in FIG. 5 (compare with FIGS. 1-2).

FIG. 5 illustrates a first symbol 510 and a second adjacent symbol 520, where the first symbol is a repetition of the second symbol (i.e. the original symbol). The first and second symbol comprise K subcarriers, where K is an integer.

In FIG. 5, the K subcarriers are divided into two sets of subcarriers. One set comprises the even subcarriers, and the other set comprises the odd subcarriers. Hence, the even subcarriers may be indexed with $$2k, k = 0, 1, \ldots, \frac{K}{2} - 1,$$

and the odd subcarriers may be indexed $$(2k + 1), k = 0, 1, \ldots, \frac{K}{2} - 1.$$

All used even subcarriers 2k in the second symbol 520 are modulated by reference signals $$R_{2k}^{(n)}$$

(symbol n, subcarriers 2k). All used even subcarriers in the first symbol 510 are modulated with $$\tilde{R}_{2k}^{(n-1)},$$

where $$\tilde{R}_{2k}^{(n-1)}$$

are the reference signals $$R_{2k}^{(n)}$$

with appropriate phase multiplied.

All used odd subcarriers 2k+1 in the second symbol 520 are modulated by payload signals $$X_{2k+1}^{(n)}$$

(symbol n, subcarriers 2k+1). All used odd subcarriers in the first symbol are modulated by payload signals $$\tilde{X}_{2k+1}^{(n-1)},$$

where $$\tilde{X}_{2k+1}^{(n-1)}$$

are the payload signals $$X_{2k+1}^{(n)}$$

having been shifted with the same linear phase shift as $$\tilde{R}_{2k}^{(n-1)}.$$

Hence, FIG. 5 illustrates for at least one multicarrier symbol 520 comprising a first subcarrier (2k) modulated with an original reference signal $$R_{2k}^{(n)}$$

and multiplexed with a second subcarrier (2k+1) modulated with an original payload signal $$X_{2k+1}^{(n)}.$$

The multiple symbol shift configuration is applied on a second multicarrier symbol 510 adjacent to the first multi-carrier 520 symbol and the reference signal $$R_{2k}^{(n)}$$

and the payload signal $$X_{2k+1}^{(n)}$$

are repeated in the second multicarrier symbol 510 on respective subcarriers (2k; 2k+1). A linear phase shift is applied to each repeated reference signal and payload signal, wherein the same linear phase shift is used for both the repeated reference signal $$\tilde{R}_{2k}^{(n-1)}$$

and the repeated payload signal $$\tilde{X}_{2k+1}^{(n-1)}.$$

For example, $$\tilde{R}_{2K}^{(n-1)} = e^{-j2\pi/NkP} R_{2d}^{(n)} \text{ and } \tilde{X}_{2k+1}^{(n-1)} = e^{-j2\pi/NkP} X_{2k+1}^{(n)}$$

where N is the OFDM inverse fast Fourier transform (IFFT) size and P is the length of the cyclic prefix.

Although FIG. 5 illustrates two symbols (one original and one repeated), the methods 300 and 400 may be applied on multiple repeated symbols. For example, up to four repeated symbols may be utilized. However, more repeated symbols may be utilized, but parameters relating to e.g. symbol overhead vs. gain in interference reduction may in such cases be considered.

The shift used for multiple symbols may be realized as follows:

If symbol n carries data or payload $$X_{2k+1}^{(n)},$$

multicarrier symbol n−m should be modulated with $$\tilde{X}_{2k+1}^{(n-m)} = e^{-j2\pi/NkmP} X_{2k+1}^{(n)}, m = 1, 2, \dots, M-1. M$$

is the total number of symbols in the multi-symbol data structure, e.g. M=2 for double-symbol or M=3 for triple-symbol structure, etc.

In FIG. 5, both payload signal $$X_{2k+1}^{(n)}$$

and repeated and shifted payload signal $$\tilde{X}_{2k+1}^{(n-1)}$$

comprise the same payload. I.e., the replicated signals are identical to the original, apart from the repeated signal having been subject to a linear phase shift. However, it is possible to allow for some of the repeated payload signal(s) to comprise different content than the original payload signal(s).

Hence, in some embodiments, on at least one subcarrier the original payload signal and the repeated and shifted payload signal comprise different payload.

When the data signals are not perfectly repeated and shifted, it may typically give rise to increased ICI and ISI during channel estimation. However, the severity of the interference is typically proportional to the number of data modulation signals $$\tilde{X}_{2k+1}^{(n-1)}$$

that are not the same as their counterpart $$X_{2k+1}^{(n)}.$$

It is hence possible to allow the wireless communication network to operate with a subset of non-repeated payload signals within a repeated symbol without impacting the interference too much.

Furthermore, if the different payloads are on subcarriers positioned far apart (in frequency domain) from subcarriers which channel estimation will be performed on, the effect on the robustness of the channel estimation is less compared to when the different payload are on subcarriers close in frequency to the channel estimation subcarriers. This is also something that may be taken into consideration in some embodiments when allowing the repeated payload and original payload to differ on at least one subcarrier. It may e.g. be determined which subcarrier(s) is to be used for channel estimation and then modulating different payload compared to the original payload onto a subcarrier in the repeated symbol that is positioned at least three subcarriers away from the subcarrier intended for channel estimation. Other distances between the subcarriers are of course envisioned, and may be based e.g. on the frequency range of the subcarriers and/or expected interference. E.g. distances of 2, 4, 5, 8, 10 etc. subcarriers may be used.

This embodiment allows for a trade-off between e.g. robustness and/or bit rate, and interference. When there is no constraint to perfectly repeat the payload signals for all subcarriers, other types of payload or information can be transmitted in the non-perfectly repeated symbol (i.e. the content of the repeated symbol is not the same as in the original symbol with regards to actual content and not just to cyclic or phase shift). Such other information may e.g. pertain to redundancy bits which may be used for decoding the current payload stream with higher reliability, or to additional information in order to increase the bit rate.

Typically, how many signals that can be allowed non-perfect repetition in a symbol without having a too high impact on interference is of course relative. The number (or amount) may typically be decided on a case to case basis as it may depend on various factors. E.g. in a scenario where other factors such as e.g. delay spread are determined to not have a severe impact on interference, a higher number of non-perfect repetitions may be allowed, compared to a scenario where e.g. the delay spread is determined to have a significant impact on the interference. As noted above, the number of subcarriers in the symbol may also be used as a factor for determining how many, or if any, signals may be repeated non-perfectly.

In some embodiments, the methods 300 and/or 400 may further comprise determining whether a first number of repeated and phase shifted payload signals that comprise different payload than the original payload signal results in an expected interference being above an interference threshold value. When, in some embodiments it is determined that the expected interference is below the interference threshold value, the methods 300 and/or 400 may comprise allowing, on at least one subcarrier, the original payload signal and the repeated and shifted payload signal to comprise different payload. Furthermore, in some embodiments, when it is determined that the expected interference is above the interference threshold value, the methods 300 and/or 400 may comprise refraining from allowing on at least one subcarrier the original payload signal and the repeated and shifted payload signal to comprise different payload.

Furthermore, in some embodiments the original payload signal and the repeated and shifted pay load signal comprises different payload on a third of a total number of subcarriers (or on less than a third of the total number of subcarriers). Other values then e.g. "a third" or "less than a third" are contemplated and may be determined on a case by case basis.

FIG. 6 illustrates a computer program product comprising a non-transitory computer readable medium 600, wherein the non-transitory computer readable medium 600 has stored there on a computer program comprising program instructions. The computer program is configured to be loadable into a data-processing unit 610, comprising a processor (PROC) 620 and a memory (MEM) 630 associated with or integral to the data-processing unit. When loaded into the data-processing unit 610, the computer program is configured to be stored in the memory 620, wherein the computer program, when loaded into and run by the processor 630 is configured to cause the processor to execute method steps according to any of the methods described in conjunction with the FIGS. 3-5.

FIG. 7 illustrates an apparatus 700 for reducing inter symbol interference (ISI) and inter channel interference (ICI) in transmissions between a sender and recipient within a wireless communication network according to some embodiments. The apparatus 700 may e.g. be configured to carry out any of the methods 300 and 400 described above in conjunction with FIGS. 3 and 4. The apparatus 700 may further be comprised within any one of a network node and a wireless communication device.

The apparatus 700 comprises controlling circuitry (CNTR) 710 (i.e. a controller or a controlling module) configured to cause, for at least one multicarrier symbol comprising a first subcarrier modulated with a reference signal and multiplexed with a second subcarrier modulated with a payload signal:

application of a multiple symbol shift configuration on at least a second multicarrier symbol subsequent to the first multicarrier symbol by being configured to cause:

repetition of the reference signal and the payload signal in the second multicarrier symbol on respective subcarriers; and application of a linear phase shift to each repeated reference signal and payload signal, wherein the same linear phase shift is used for both the repeated reference signal and the repeated payload signal.

Furthermore, as seen in FIG. 7, the controlling circuitry 710 may in some embodiments further comprise one or more submodules or sub-units. The controlling circuitry 710 may in some embodiments comprise a configurer (CONF) 711. It may comprise a thresholder (THRESH) 712. It may comprise a modulator (MOD) 713. The apparatus 700 may further comprise an input/output module (RX/TX) 701. The input/output module 701 may be configured to receive and transmit signals. It may e.g. be one or more of an antenna array, a single antenna, a receiver, a transmitter, a transceiver or any other communication component used for input/output. In some embodiments, the controlling circuitry 710 comprises the input/output module 701.

In some embodiments, the controlling circuitry 710 may cause the configurer 711 to cause application of the multiple shift configuration on at least a second multicarrier symbol subsequent to the first multicarrier symbol by repeating the reference signal and payload signal in the second multicarrier symbol. In some embodiments, the configurer 711 may further be configured to apply linear phase shift to the repeated payload signal, which linear phase shift corresponds to a linear phase shift applied to the repeated reference signal.

As previously, linear phase shift is the corresponding operation to cyclic shift (which time-domain operation may also be applied by the controlling circuitry and/or configure), but in frequency domain, and it is hence typically applied during modulation of the reference and payload signals onto the subcarriers.

In some embodiments, the reference signal is at least one of a Demodulation Reference Signal (DMRS), a Sounding Reference Signal (SRS) or a Channel State Information Reference Signal (CSI-RS), or any other reference signal compatible with a multiple symbol structure.

In some embodiments, the payload signal is a Data signal or Control signal.

In some embodiments, the controlling circuitry 710 is further configured to cause:

determination of whether a performance criterion is met prior to causing application of the multiple symbol shift configuration and further causing application of the multiple symbol shift configuration when it is determined that the performance criterion is met.

E.g., in some embodiments, the controlling circuitry 710 may cause the thresholder 712 to determine wither the performance criterion is met.

In some embodiments, causing determination of whether the performance criterion is met comprises the controlling circuitry 710 being configured to cause at least one of the following:

determination of whether an anticipated delay spread in the wireless communication network exceeds a delay spread threshold value;

determination of whether a high modulation coding scheme is used for transmissions within the wireless communication network;

determination of whether there is a risk that a cyclic prefix applied to the multicarrier symbol is shorter than an impulse response associated with transmitting the multicarrier symbol; and reception of an indication that the multiple symbol configuration is to be applied from the recipient, wherein the recipient is one or more of a wireless communication device and a network node operably connected to the wireless communication network.

For example, in some embodiments, the controlling circuitry 710 may be configured to cause the thresholder to determine whether the anticipated delay spread exceeds the delay spread threshold value. The thresholder 712 may e.g. be configured to receive information regarding delay spread, anticipated and/or experienced, within the wireless network (the information may e.g. be received via the input/output module 701 and may originate from e.g. a wireless communication device or network node operating within the network). The thresholder 721 may be configured to analyze received information associated with anticipated (or experienced) delay spread and determine whether the anticipated (and/or experienced) delay spread exceeds the delay spread threshold value.

The thresholder 712 may be configured to inform the controlling circuitry 710 and/or the configurer 711 whether it was determined that the anticipated (or experienced) delay spread exceeds the delay spread threshold value. The configurer 711 may be configured to apply the multiple symbol shift configuration based on the determination that the delay spread exceeds the delay spread threshold value. The configurer 711 may be configured to make this decision directly, or after receiving a prompt from the controlling circuitry 710.

Transmissions in a OFDM based communication systems, and/or other type of multicarrier based communication system may typically be realized through high-order or low order modulation schemes. It is e.g. common to utilize higher-order modulations in downlink compared to uplink since a high-order modulation typically requires more resources in terms of power (and generally a network node such as a base station has less requirements on power utilization than e.g. a wireless communication device. However, high-order modulation schemes such as 16 quadrature amplitude modulation (QAM), or higher, may typically be more sensitive to ISI and ICI than low-order modulations schemes such as various types of phase shift keying (PSK).

Hence, in some embodiments, the controlling circuitry 710 may cause the modulator 713 to determine whether the performance criterion is met by determining that a high-order modulation is applied. As an example, the high-order modulation may e.g. be applied in downlink transmissions but not in uplink; and the multiple symbol shift configuration may thus be utilized for downlink transmissions but not for uplink transmissions (or vice versa).

Furthermore, the thresholder 712 may be configured to determine whether different numerologies and cyclic prefix lengths are allowed for transmissions within the wireless communication network. The thresholder 712 may in such case be configured to determine whether there is a risk that the cyclic prefix associated with the multicarrier symbol risk being too short with regards to an expected impulse response associated with transmitting the multicarrier symbol.

What may be regarded as a too short cyclic prefix may vary. As elaborated on above. The terms too short, or long enough, should typically be seen in relation to the channel impulse response. The channel impulse response may typically vary based on factors such as unsymmetric beamforming, delay spread in the network, and modulation scheme.

Hence, as a precaution, when different numerologies are allowed, cyclic prefixes that are below e.g. a predetermined length may be regarded as short. Symbols utilizing these cyclic prefixes may thus be subjected to the multiple symbol shift configuration, in order to increase the likelihood that the cyclic prefix is sufficiently long so that ICI/ISI is reduced.

What defines the predetermined length, may again be a dynamic process. Hence, the predetermined length may be set on a case to case basis. The predetermined length may e.g. be based on current network characteristics pertaining to e.g. delay spread, beamforming, modulation schemes, etc. The controlling circuitry 710 may thus in some embodiments be configured to cause determination of a threshold value for the cyclic prefix (e.g. by causing the thresholder 712 to determine).

The controlling circuitry 710 may in some embodiments be configured to cause reception of the indication that the multiple shift configuration should be applied. E.g. by causing the input/output module 701 to receive the indication from a recipient in the wireless communication network. The recipient may e.g. be a wireless communication device operating in the wireless communication network. In some embodiments the recipient is a network node (e.g. an eNB or a gNB or other type of base station).

In some embodiments, the controlling circuitry 710 may be configured to cause instructing of the recipient to apply the multiple symbol configuration, wherein the recipient is at least one of the following: a wireless communication device and a network node.

The controlling circuitry 710 may e.g. be configured to cause the input/output module 701 to transmit an instruction to the recipient to apply the multiple symbol shift configuration (e.g. in uplink transmissions if the recipient is a wireless communication device, or downlink transmissions if the recipient is a network node).

Typically, in some embodiments, instructing the recipient may relate to the above described steps or conditions for triggering the use of the methods 300 and/or 400.

In some embodiments, the controlling circuitry 710 may further be configured to cause informing of the recipient, of the applied multiple symbol shift configuration. Hence if the sender applies either of the methods 300 and 400 in uplink or downlink transmissions, the recipient may be informed.

In some embodiments, on at least one subcarrier the original payload signal and the repeated and shifted payload signal comprise different payload.

In some embodiments, the controlling circuitry 710 may be configured to cause determination of whether a first number of repeated and phase shifted payload signals that comprise different payload than the original payload signal results in an expected interference being above an interference threshold value.

When, in some embodiments it is determined that the expected interference is below the interference threshold value, the controlling circuitry 710 may be configured to cause allowing on at least one subcarrier the original payload signal and the repeated and shifted payload signal to comprise different payload.

Furthermore, in some embodiments, when it is determined that the expected interference is above the interference threshold value, the controlling circuitry 710 may be configured to cause refraining from allowing on at least one subcarrier the original payload signal and the repeated and shifted payload signal to comprise different payload.

The controlling circuitry 710 may e.g. be configured to cause the thresholder to determine whether the interference threshold value is exceeded.

Based on the determination of whether non-perfect replication may be allowed for subsequent multiple symbols, the controlling circuitry 710 (possibly in cooperation thresholder 712 with the modulator 713) may determine how many signals may be non-perfectly repeated and modulate these in the subsequent multiple symbols. The amount should preferably be set keeping in mind the increased interference in relation to the expected gain in e.g. bit rate or increased reliability in decoding.

Furthermore, in some embodiments the original payload signal and the repeated and shifted payload signal comprise different pay load on a third (or less) of a total number of subcarriers.

As noted above, the apparatus 700 may be comprised in a network node and/or a wireless communication device. A network node may e.g. be a radio base station, a eNB, gNB, access node, controlling node etc. A wireless communication device may e.g. be a user equipment (UE), mobile phone, hand set, computer, note book etc.

As has been noted above, the methods 300 and 400, which e.g. the apparatus 700 may be configured to carry out, mentions a sender and a recipient. Who, or which entity the sender or the recipient is depends on where the apparatus 700 is located. E.g. if the apparatus is comprised in a network node, the network node is typically the sender. The recipient may be a wireless communication device which is served by the network node. The recipient may in some embodiments be another network node communicating with the network node holding the apparatus. Furthermore, in some embodiments, the sender and the recipient is the same entity. It should also be noted, that both the sender and the recipient may comprise a respective apparatus 700.

Figure 8:
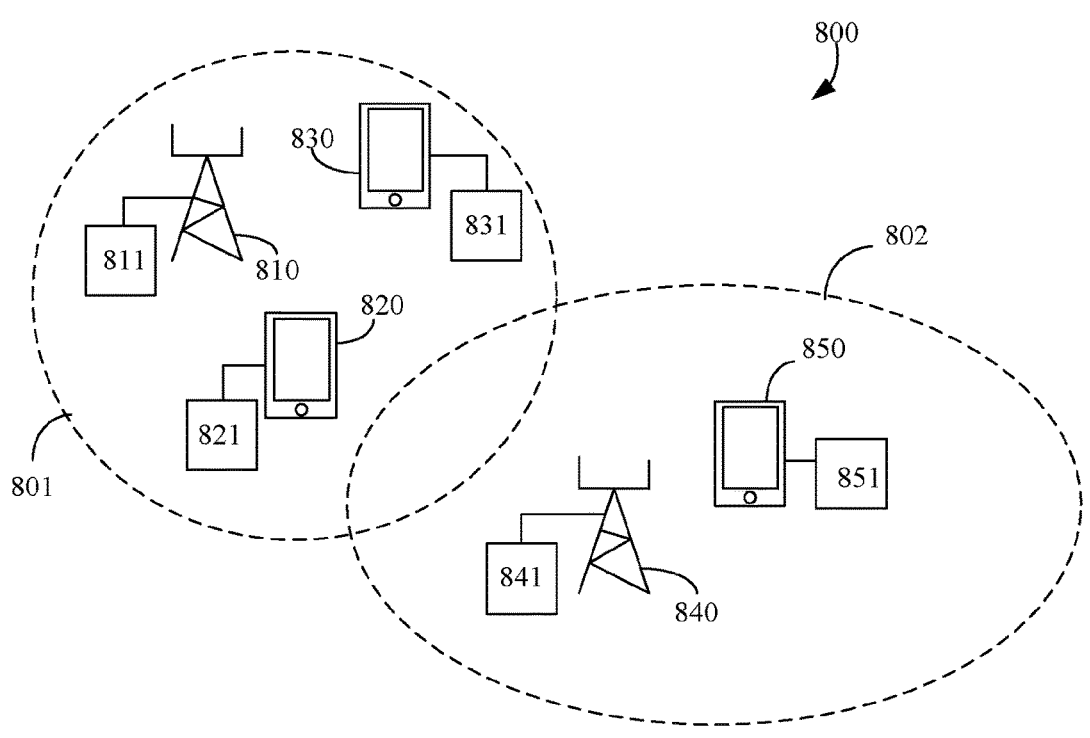
FIG. 8 is a schematic drawing illustrating a network scenario according to some embodiments FIG. 9 schematically illustrates a telecommunication network connected via an intermediate network to a host computer.

An example scenario according to some embodiments is illustrated in FIG. 8.

FIG. 8 schematically illustrates a wireless communication network 800 comprising a first network cell 801, and a second network cell 802.

The first network cell 801, comprises a first network node 810, serving a first wireless communication device 820 and a second wireless communication device 830. The first network node 810 and the first 820 and second 830 wireless communication device comprise a respective apparatus 811, 821 831. The respective apparatus 811, 821, 831 may e.g. be the apparatus 700 as described in conjunction with FIG. 7, and configured to carry out any of the methods 300 and 400 as described in conjunction with FIGS. 3 and 4.

Similarly, the second network cell 802 comprises a second network node 840, serving a third wireless communication device 850. The second network node 840 and the third wireless communication device 850, each comprises a respective apparatus 841, 851. The respective apparatus 841, 851 may e.g. be the apparatus 700 as described in conjunction with FIG. 7 and configured to carry out any of the methods 300 and 400 as described in conjunction with FIGS. 3 and 4.

Hence, FIG. 8 illustrates a network node 810, 840 configured to operate in a wireless communication network 800 and configured to serve at least one wireless communication device 820, 830, 850 operably connected to the wireless communication network 800, wherein the network node 810, 840 comprises the apparatus 811, 821, 831, 841, 851 as described in conjunction with FIG. 7.

Furthermore, FIG. 8 illustrates a wireless communication device 820, 830, 850 configured to be operably connected to a wireless communication network 800 and to be served by at least one network node 810, 840 associated with the wireless communication network 800, wherein the wireless communication device comprises the apparatus 811, 812, 831, 841, 851 as described in conjunction with FIG. 7.

The embodiments described herein enable reduced ISI and ICI when multiple symbols are used, wherein the multiple symbols comprise reference signals multiplexed with payload signals.

The embodiments described herein enables accurate channel estimation of impulse responses that are longer than the cyclic prefix without altering the length of the multicarrier symbols transmitting payload multiplexed with reference signals. Hence transmission resources may be saved.

Furthermore, some of the embodiments described herein enable a trade-off between decreased interference and increased bit rate. Hence overall transmission efficiency may be increased.

Some of the embodiments described herein enables an overall enhanced system performance due to improved channel estimation and increased data-rates.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

According to some embodiments, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 3 and 4.

Figure 9:
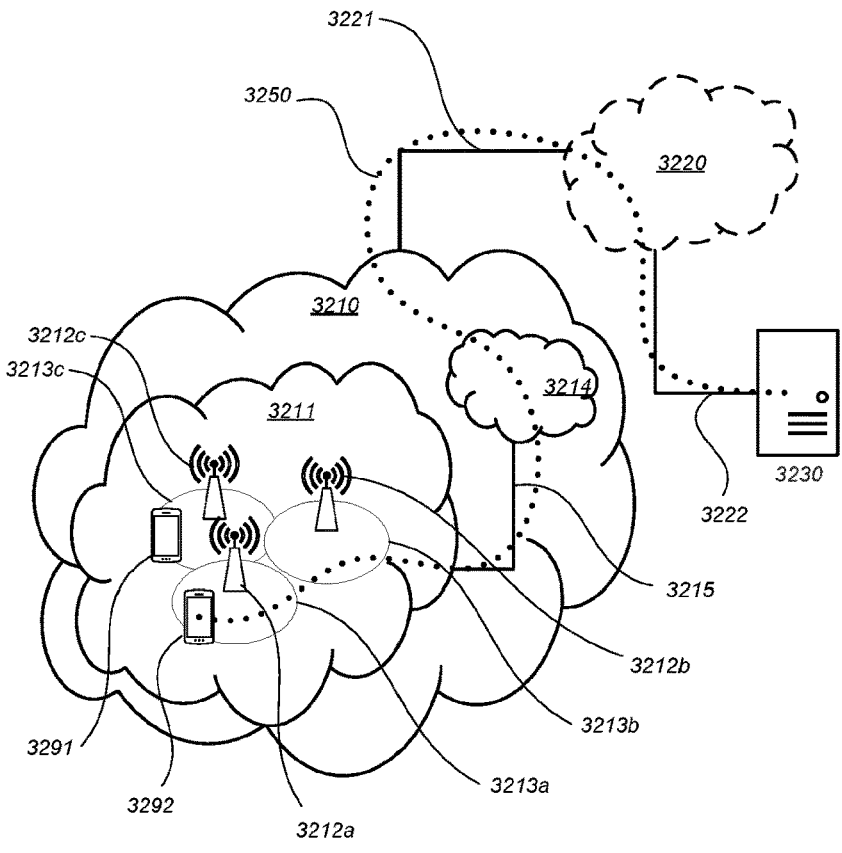

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
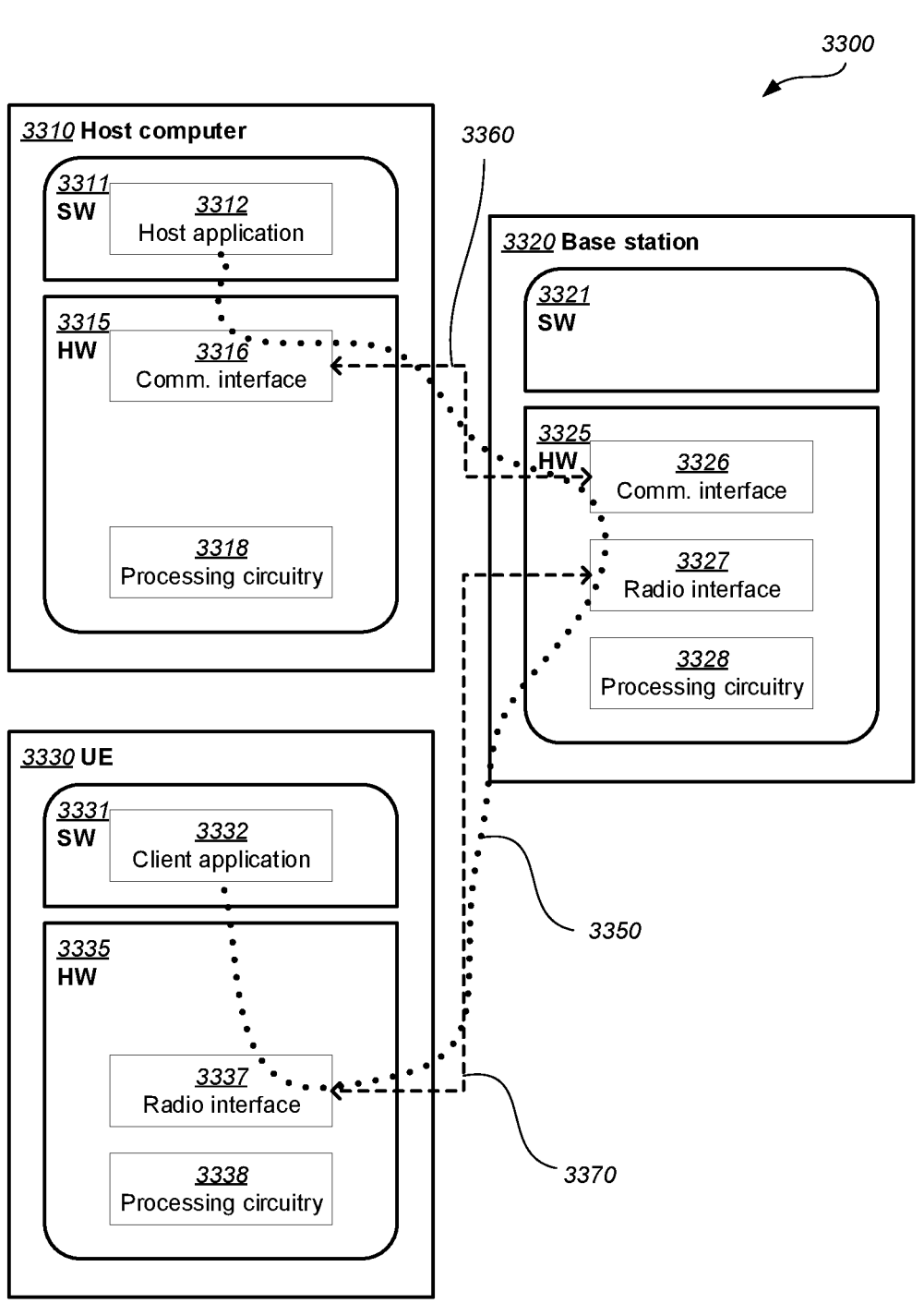
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212*a*, 3212*b*, 3212*c* and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 1020 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the channel robustness and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 1050 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
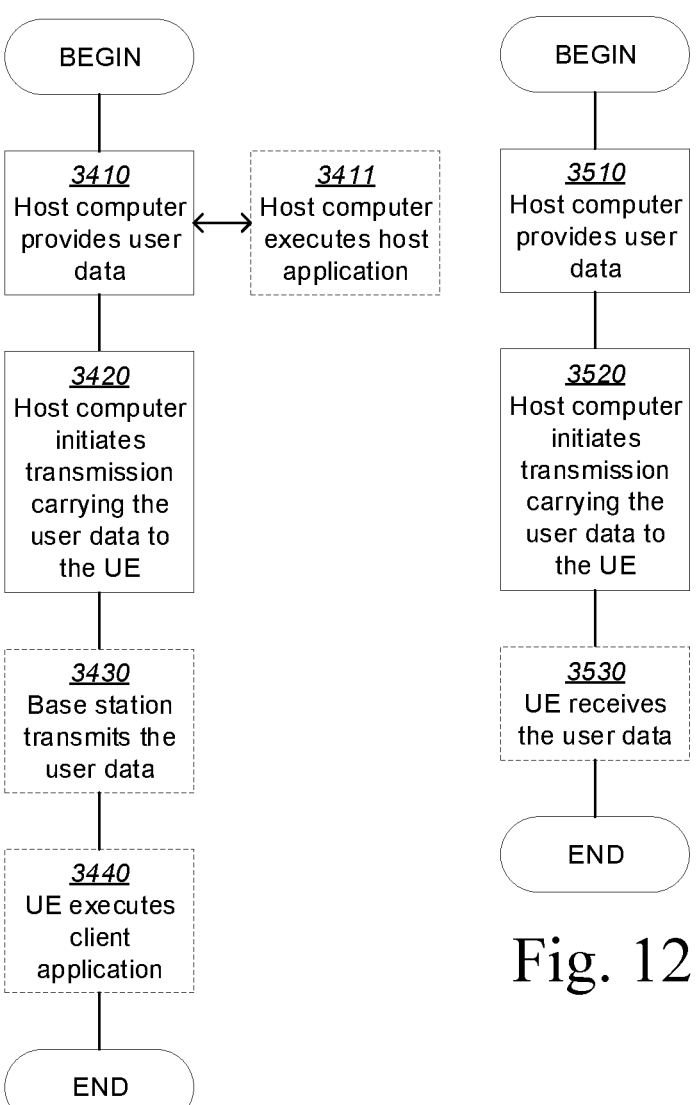
FIGS. 11-14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 13:
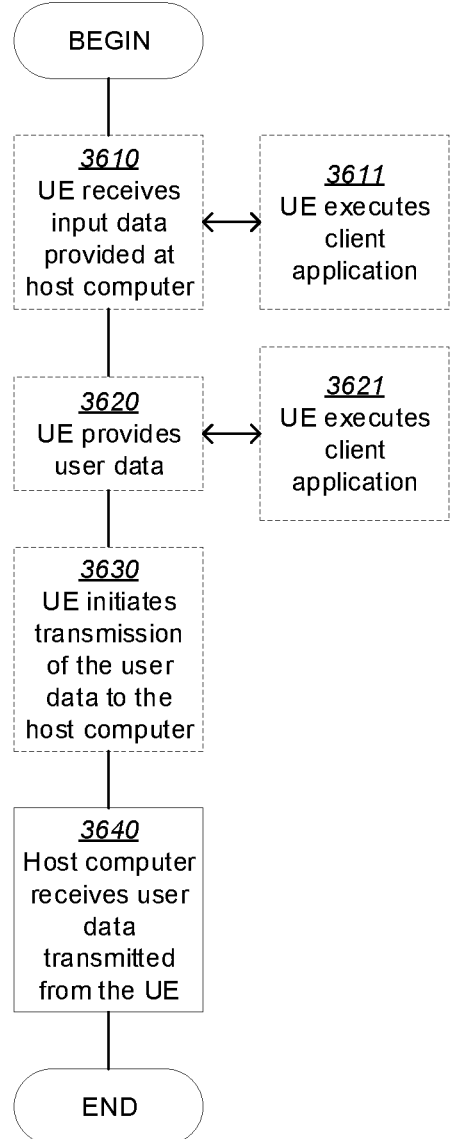

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 14:
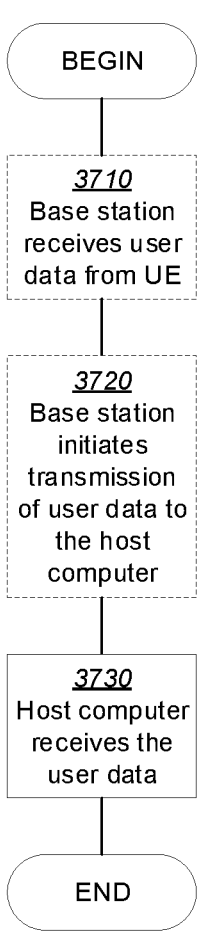

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Numbered Embodiments

1. A base station configured to communicate with a user equipment (UE), the base station comprising a radio interface and processing circuitry configured to reducing inter symbol interference (ISI) and inter carrier interference (ICI) in transmissions between the base station and the UE within a wireless communication network, wherein for at least one multicarrier symbol comprising a first subcarrier modulated with an original reference signal and multiplexed with a second subcarrier modulated with an original payload signal, the processing circuitry is configured to cause:
   applying of a multiple symbol shift configuration on at least a second multicarrier symbol adjacent to the first multicarrier symbol by:
   repeating of the original reference signal and the original payload signal in the second multicarrier symbol on respective subcarriers; and
   applying of a linear phase shift to each repeated reference signal and payload signal, wherein the same linear phase shift is used for both the repeated reference signal and the repeated payload signal.

2. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps described for the numbered embodiment 1.

3. The communication system of numbered embodiment 2, further including the base station.

4 The communication system of numbered embodiment 3, further including the UE, wherein the UE is configured to communicate with the base station.

5. The communication system of numbered embodiment 4, wherein:

the processing circuitry of the host computer is configured to execute a host application, thereby providing the user data; and the UE comprises processing circuitry configured to execute a client application associated with the host application.

6. A method implemented in a base station, for reducing inter symbol interference (ISI) and inter carrier interference (ICI) in transmissions between the base station and a User Equipment (UE) within a wireless communication network, wherein for at least one multicarrier symbol comprising a first subcarrier modulated with an original reference signal and multiplexed with a second subcarrier modulated with an original payload signal, the method comprises:

applying a multiple symbol shift configuration on at least a second multicarrier symbol adjacent to the first multicarrier symbol by:

repeating the original reference signal and the original payload signal in the second multicarrier symbol on respective subcarriers; and applying a linear phase shift to each repeated reference signal and payload signal, wherein the same linear phase shift is used for both the repeated reference signal and the repeated payload signal.

7. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station carries out the method according to the numbered embodiment 6.

8. The method of numbered embodiment 7, further comprising:

at the base station, transmitting the user data.

9. The method of numbered embodiment 8, wherein the user data is provided at the host computer by executing a host application, the method further comprising:

at the UE, executing a client application associated with the host application.

10. A user equipment (UE) configured to communicate with a base station, the UE comprising a radio interface and processing circuitry configured to for reducing inter symbol interference (ISI) and inter carrier interference (ICI) in transmissions between the UE and a base station within a wireless communication network, wherein for at least one multicarrier symbol comprising a first subcarrier modulated with an original reference signal and multiplexed with a second subcarrier modulated with an original payload signal, the UE is configured to cause:

applying of a multiple symbol shift configuration on at least a second multicarrier symbol of adjacent to the first multicarrier symbol by:

repeating of the original reference signal and the original payload signal in the second multicarrier symbol of on respective subcarriers; and applying of a linear phase shift to each repeated reference signal and payload signal, wherein the same linear phase shift is used for both the repeated reference signal and the repeated payload signal.

11. A communication system including a host computer comprising:

processing circuitry configured to provide user data; and a communication interface configured to forward user data to a cellular network for transmission to a user equipment (UE), wherein the UE comprises a radio interface and processing circuitry, the UE's processing circuitry configured to carry out the steps as described for the numbered embodiment 10.

12. The communication system of embodiment 13, further including the UE.

13. The communication system of embodiment 12, wherein the cellular network further includes a base station configured to communicate with the UE.

14. The communication system of numbered embodiment 12 or 13, wherein:

the processing circuitry of the host computer is configured to execute a host application, thereby providing the user data; and the UE's processing circuitry is configured to execute a client application associated with the host application.

15. A method implemented in a user equipment (UE), comprising for at least one multicarrier symbol comprising a first subcarrier modulated with an original reference signal and multiplexed with a second subcarrier modulated with an original payload signal:

applying a multiple symbol shift configuration on at least a second multicarrier symbol adjacent to the first multicarrier symbol by:

repeating the original reference signal and the original payload signal in the second multicarrier symbol on respective subcarriers; and applying a linear phase shift to each repeated reference signal and payload signal, wherein the same linear phase shift is used for both the repeated reference signal and the repeated payload signal.

16. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE carries out the steps as defined for the numbered embodiment 15.

17. The method of numbered embodiment 16, further comprising:

at the UE, receiving the user data from the base station.

18. A communication system including a host computer comprising:

a communication interface configured to receive user data originating from a transmission from a user equipment (UE) to a base station, wherein the UE comprises a radio interface and processing circuitry, the UE's processing circuitry configured to carry out the steps according to the numbered embodiment 15.

19. The communication system of numbered embodiment 18, further including the UE.

20. The communication system of numbered embodiment 19, further including the base station, wherein the base station comprises a radio interface configured to communicate with the UE and a communication interface configured to forward to the host computer the user data carried by a transmission from the UE to the base station.

21. The communication system of numbered embodiment 19 or 20, wherein:

the processing circuitry of the host computer is configured to execute a host application; and the UE's processing circuitry is configured to execute a client application associated with the host application, thereby providing the user data.

22. The communication system of numbered embodiment 20 or 21, wherein:

the processing circuitry of the host computer is configured to execute a host application, thereby providing request data; and the UE's processing circuitry is configured to execute a client application associated with the host application, thereby providing the user data in response to the request data.

23. A method implemented in a user equipment (UE), comprising the steps described for the numbered embodiment 15.

24. The method of embodiment 23, further comprising:

providing user data; and forwarding the user data to a host computer via the transmission to the base station.

25. A method implemented in a communication system including a host computer, a base station and a user equipment (UE), the method comprising:

at the host computer, receiving user data transmitted to the base station from the UE, wherein the UE carries out the steps according to the numbered embodiment 15.

26. The method of numbered embodiment 25, further comprising:

at the UE, providing the user data to the base station.

27. The method of numbered embodiment 26, further comprising:

at the UE, executing a client application, thereby providing the user data to be transmitted; and at the host computer, executing a host application associated with the client application.

28. The method of numbered embodiment 27, further comprising:

at the UE, executing a client application; and at the UE, receiving input data to the client application, the input data being provided at the host computer by executing a host application associated with the client application, wherein the user data to be transmitted is provided by the client application in response to the input data.

29. A communication system including a host computer comprising a communication interface configured to receive user data originating from a transmission from a user equipment (UE) to a base station, wherein the base station comprises a radio interface and processing circuitry, the base station's processing circuitry configured to carry out the steps according to the numbered embodiment 1.

30. The communication system of numbered embodiment 29, further including the base station.

31. The communication system of numbered embodiment 30, further including the UE, wherein the UE is configured to communicate with the base station.

32. The communication system of numbered embodiment 31, wherein:

the processing circuitry of the host computer is configured to execute a host application;

the UE is configured to execute a client application associated with the host application, thereby providing the user data to be received by the host computer.

33. A method implemented in a communication system including a host computer, a base station and a user equipment (UE), the method comprising:

at the host computer, receiving, from the base station, user data originating from a transmission which the base station has received from the UE, wherein the base station carries out the steps according to the numbered embodiment 9.

34. The method of numbered embodiment 33, further comprising:

at the base station, receiving the user data from the UE.

35. The method of numbered embodiment 34, further comprising:

at the base station, initiating a transmission of the received user data to the host computer.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for reducing inter symbol interference (ISI) and inter carrier interference (ICI) in transmissions between a sender and a recipient within a wireless communication network, at least a first multicarrier symbol comprising a first subcarrier modulated with an original reference signal and multiplexed with a second subcarrier modulated with an original payload signal, the method comprising:

applying a multiple symbol shift configuration on at least a second multicarrier symbol adjacent to the first multicarrier symbol by:

repeating the original reference signal and the original payload signal in the second multicarrier symbol on respective subcarriers; and applying a linear phase shift to the repeated reference signal and the repeated payload signal, the same linear phase shift being used for both the repeated reference signal and the repeated payload signal.

2. The method according to claim 1, wherein the original reference signal is at least one of a Demodulation Reference Signal (DMRS), Channel State Information Reference signal (CSI-RS) or a Sounding Reference Signal (SRS), or any other reference signal compatible with a multiple symbol structure.

3. The method according to claim 1, wherein the original payload signal is a Data signal or control signal.

4. The method according to claim 1, further comprising:

determining whether a performance criterion is met prior to applying the multiple symbol shift configuration; and applying the multiple symbol shift configuration when it is determined that the performance criterion is met.

5. The method according to claim 4, wherein determining whether the performance criterion is met comprises at least one of the following:

determining whether an anticipated delay spread in the wireless communication network exceeds a delay spread threshold value;

determining whether a high-order modulation coding scheme is used for transmissions within the wireless communication network;

determining whether there is a risk that a cyclic prefix applied to the multicarrier symbol is shorter than an impulse response associated with transmitting the multicarrier symbol; and receiving from the recipient an indication that the multiple symbol shift configuration is to be applied, wherein the recipient is one of a wireless communication device and a network node.

6. The method according to claim 1, further comprising:

instructing the recipient to apply the multiple symbol configuration, wherein the recipient is at least one of a wireless communication device and a network node.

7. An apparatus for reducing inter symbol interference (ISI) and inter carrier interference (ICI) in transmissions between a sender and a recipient within a wireless communication network, the apparatus comprising controlling circuitry configured to cause, for at least a first multicarrier symbol comprising a first subcarrier modulated with an original reference signal and multiplexed with a second subcarrier modulated with an original payload signal:

application of a multiple symbol shift configuration on at least a second multicarrier symbol adjacent to the first multicarrier symbol by:

repetition of the original reference signal and the original payload signal in the second multicarrier symbol on respective subcarriers; and application of a linear phase shift to each repeated reference signal and payload signal, wherein the same linear phase shift is used for both the repeated reference signal and the repeated payload signal.

8. The apparatus according to claim 7, wherein the original reference signal is at least one of a Demodulation Reference Signal (DMRS), Channel state information Reference signal (CSI-RS) or a Sounding Reference Signal (SRS), or any other reference signal compatible with a multiple symbol structure.

9. The apparatus according to claim 7, wherein the original payload signal is a Data signal or Control signal.

10. The apparatus according to claim 7, wherein the controlling circuitry is further configured to cause:

determination of whether a performance criterion is met prior to causing application of the multiple symbol shift configuration; and application of the multiple symbol shift configuration when it is determined that the performance criterion is met.

11. The apparatus according to claim 10, wherein the determination of whether the performance criterion is met comprises at least one of the following:

determination of whether an anticipated delay spread in the wireless communication network exceeds a delay spread threshold value;

determination of whether a high modulation coding scheme is used for transmissions within the wireless communication network;

determination of whether there is a risk that a cyclic prefix applied to the multicarrier symbol is shorter than an impulse response associated with transmitting the multicarrier symbol; and reception of an indication that the multiple symbol configuration is to be applied from the recipient, wherein the recipient is one of a wireless communication device and a network node.

12. The apparatus according to claim 7, wherein the controlling circuitry is configured to cause:

instruction of the recipient, to apply the multiple symbol shift configuration, wherein the recipient is at least one of a wireless communication device and a network node.

13. The apparatus according to claim 7, the apparatus being comprised in a network node configured to operate in a wireless communication network and configured to serve at least one wireless communication device, the network node operably connected to the wireless communication network.

14. The apparatus according to claim 7, the apparatus being comprised in a wireless communication device configured to be operably connected to a wireless communication network and to be served by at least one network node associated with the wireless communication network.

15. A non-transitory computer storage medium storing a computer program, comprising instructions which, when executed on at least one processor, cause the at least one processor to carry out a method for reducing inter symbol interference (ISI) and inter carrier interference (ICI) in transmissions between a sender and a recipient within a wireless communication network, at least a first multicarrier symbol comprising a first subcarrier modulated with an original reference signal and multiplexed with a second subcarrier modulated with an original payload signal, the method comprising:

applying a multiple symbol shift configuration on at least a second multicarrier symbol adjacent to the first multicarrier symbol by:

repeating the original reference signal and the original payload signal in the second multicarrier symbol on respective subcarriers; and applying a linear phase shift to the repeated reference signal and the repeated payload signal, the same linear phase shift being used for both the repeated reference signal and the repeated payload signal.

* * * * *